(12) United States Patent
Johnson et al.

(10) Patent No.: US 7,944,574 B2
(45) Date of Patent: May 17, 2011

(54) REMOTE FIRMWARE UPGRADE VIA I/O CONNECTION

(75) Inventors: Steven Mark Johnson, Eagle, ID (US); John Leland Boldon, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 11/789,155

(22) Filed: Apr. 24, 2007

(65) Prior Publication Data
US 2007/0201075 A1 Aug. 30, 2007

Related U.S. Application Data

(62) Division of application No. 10/007,963, filed on Nov. 2, 2001, now abandoned.

(51) Int. Cl.
*G06F 3/12* (2006.01)
(52) U.S. Cl. ...... 358/1.15; 358/1.9; 358/1.13; 358/1.14; 358/1.16; 709/202; 709/203; 709/219
(58) Field of Classification Search .......... 358/1.15, 358/1.9, 1.13, 1.14, 1.16; 709/202, 203, 709/219
See application file for complete search history.

(56) References Cited

U.S. PATENT DOCUMENTS

| | | | |
|---|---|---|---|
| 5,228,118 A | 7/1993 | Sasaki | |
| 5,321,840 A | 6/1994 | Ahlin et al. | |
| 5,502,797 A | 3/1996 | Bush et al. | |
| 5,699,091 A | 12/1997 | Bullock et al. | |
| 5,787,288 A | 7/1998 | Nagata et al. | |
| 6,068,359 A | 5/2000 | Inose et al. | |
| 6,078,967 A | 6/2000 | Fulghum | |
| 6,108,100 A | 8/2000 | McVey et al. | |
| 6,379,058 B1 | 4/2002 | Petteruti et al. | |
| 6,515,759 B1 | 2/2003 | Smith | |
| 6,674,540 B1 | 1/2004 | Wiechers et al. | |
| 6,734,985 B1 * | 5/2004 | Ochiai | 358/1.15 |
| 6,745,334 B1 | 6/2004 | Ikegami | |
| 6,967,728 B1 * | 11/2005 | Vidyanand | 358/1.12 |
| 7,023,566 B2 * | 4/2006 | Yegnanarayanan | 358/1.1 |

FOREIGN PATENT DOCUMENTS

| | | |
|---|---|---|
| DE | 19983996 | 12/2002 |
| JP | 2001027940 | 1/2001 |
| WO | WO01/48615 | 7/2001 |

\* cited by examiner

Primary Examiner — Twyler L Haskins
Assistant Examiner — Vu B Hang

(57) ABSTRACT

Imaging devices and methods of operating imaging devices that facilitate reducing nonvolatile storage needs of the imaging devices. The imaging devices are adapted to request control programs from external devices. Control programs are received on a communication input of the imaging device and stored on a volatile storage media for use by a processor of the imaging device. The embodiments can also facilitate more reliable updating within a networked system in that updating an image of a control program on one network device can automatically lead to updating of multiple imaging devices, thus eliminating a need to individually update each imaging device. A default control program is used if no control program is received on the communication input within a predetermined timeout period.

19 Claims, 4 Drawing Sheets

REMOTE FIRMWARE UPGRADE VIA I/O CONNECTION

RELATED APPLICATION

This application is a Divisional of U.S. application Ser. No. 10/007,963 titled "REMOTE FIRMWARE UPGRADE VIA I/O CONNECTION," filed Nov. 2, 2001 now abandoned, which is commonly assigned and incorporated herein by reference.

TECHNICAL FIELD OF THE INVENTION

The present invention relates generally to imaging devices, and in particular to facilitating reduction of the amount of nonvolatile storage media in imaging devices.

BACKGROUND OF THE INVENTION

Imaging devices are found in a vast number of computer networks and personal computer setups. Imaging devices include printers, facsimile machines (faxes), plotters, multifunction devices and other devices used for producing a tangible image from image data.

The image data is typically generated by some user application in a device external to the imaging device. An example includes composing a document in a word-processing application of a computer workstation, generating image data in the word-processing application and communicating the image data to a networked or local printer to produce a hard copy of the document.

For communications efficiency, the image data is generally provided to the imaging device in a compressed form. The compressed form may be simply a compression of raster data, but is more commonly a high-level page description language (PDL) providing information to the imaging device on how to recreate the image. These PDLs are often device-independent languages, i.e., the same image data can be provided to devices of differing types and/or differing manufacturers to produce an end result that is substantially the same. Examples of PDLs include Printer Command Language or PCL (Hewlett-Packard Company, Palo Alto, Calif. USA), PostScript® (Adobe Systems Incorporated, San Jose, Calif. USA) and Interpress (Xerox Corporation, Stamford, Conn. USA).

To process these PDLs, imaging devices have what is often referred to as a formatter. The formatter has a processor that is responsive to a control program to convert the image data to a printable image. The control program typically provides interpretation of the PDLs, character generation, device emulation, etc. The printable image is typically uncompressed raster or bitmap information that is supplied to another component of the imaging device, often referred to as an engine. The engine controls the mechanical components of the imaging device to produce a tangible output, such as a hardcopy of the printable image.

The control programs responsible for conversion of the image data are often referred to as formatter firmware or simply firmware. Firmware is computer-readable instructions adapted to cause the processor to perform the conversion methods. These instructions are generally stored on a nonvolatile computer-usable medium. Some examples of nonvolatile computer-usable media include read-only memory (ROM), electrically-erasable programmable ROM (EEPROM or Flash memory), magnetic media and optical media. Because of the cost and access rates of nonvolatile memory in comparison to dynamic random access memory (DRAM; a volatile storage media), the control programs are typically stored on the nonvolatile media in a compressed form, then expanded and transferred to a volatile media for use by the processor. This approach reduces the amount of nonvolatile media that must be installed in the imaging device, thus reducing cost, and increases the access rate of the instructions by the processor, thus improving device performance.

For the reasons stated above, and for other reasons stated below that will become apparent to those skilled in the art upon reading and understanding the present specification, there is a need in the art for alternative approaches facilitating reduction of the amount of nonvolatile storage media in imaging devices.

SUMMARY

Imaging devices and methods of operating imaging devices are described that facilitate reducing nonvolatile storage needs of the imaging devices. The imaging devices are adapted to request control programs from external devices without the need to maintain a nonvolatile image of a control program within the imaging device. Control programs are received on a communication input of the imaging device and stored on a volatile storage media for use by a processor of the imaging device. The embodiments can also facilitate more reliable updating within a networked system in that updating an image of a control program on one network device can automatically lead to updating of multiple imaging devices, thus eliminating a need to individually update each imaging device.

For one embodiment, the invention provides an imaging device. The imaging device includes a communication input for receiving image data and other signals from an external device and a communication output. The imaging device further includes a formatter for converting image data into a printable image as directed by a control program, a first computer-usable media for storing the control program, and a second computer-usable media having computer-readable instructions stored thereon capable of causing a processor to perform a method. The method includes providing a signal on the communication output of the imaging device indicative of a desire to transfer a control program from an external device to the communication input of the imaging device and waiting for a control program to be received on the communication input of the imaging device in response to the signal. A default control program is transferred from the second computer-usable media to the first computer-usable media if no control program is received on the communication input prior to expiration of a timeout period.

For another embodiment, the invention provides a method of operating an imaging device. The method includes generating a request for a control program upon an initialization of the imaging device. The control program is adapted to convert image data received by the imaging device into a printable image. The method further includes providing the request on a communication output of the imaging device and waiting to receive the control program via a communication input of the imaging device. A default control program is used if no control program is received via the communication input within a predetermined timeout period.

For a further embodiment, the invention provides a computer-usable medium having computer-readable instructions stored thereon capable of causing a processor to perform a method. The method includes generating a request, in response to an initialization process, for a control program for converting image data into a printable image. The method further includes providing the request on a communication output of the processor and waiting to receive the control program via a communication input of the processor. A default control program is used if no control program is received via the communication input within a predetermined timeout period.

Further embodiments of the invention include apparatus and methods of varying scope.

DETAILED DESCRIPTION

Figure 1:
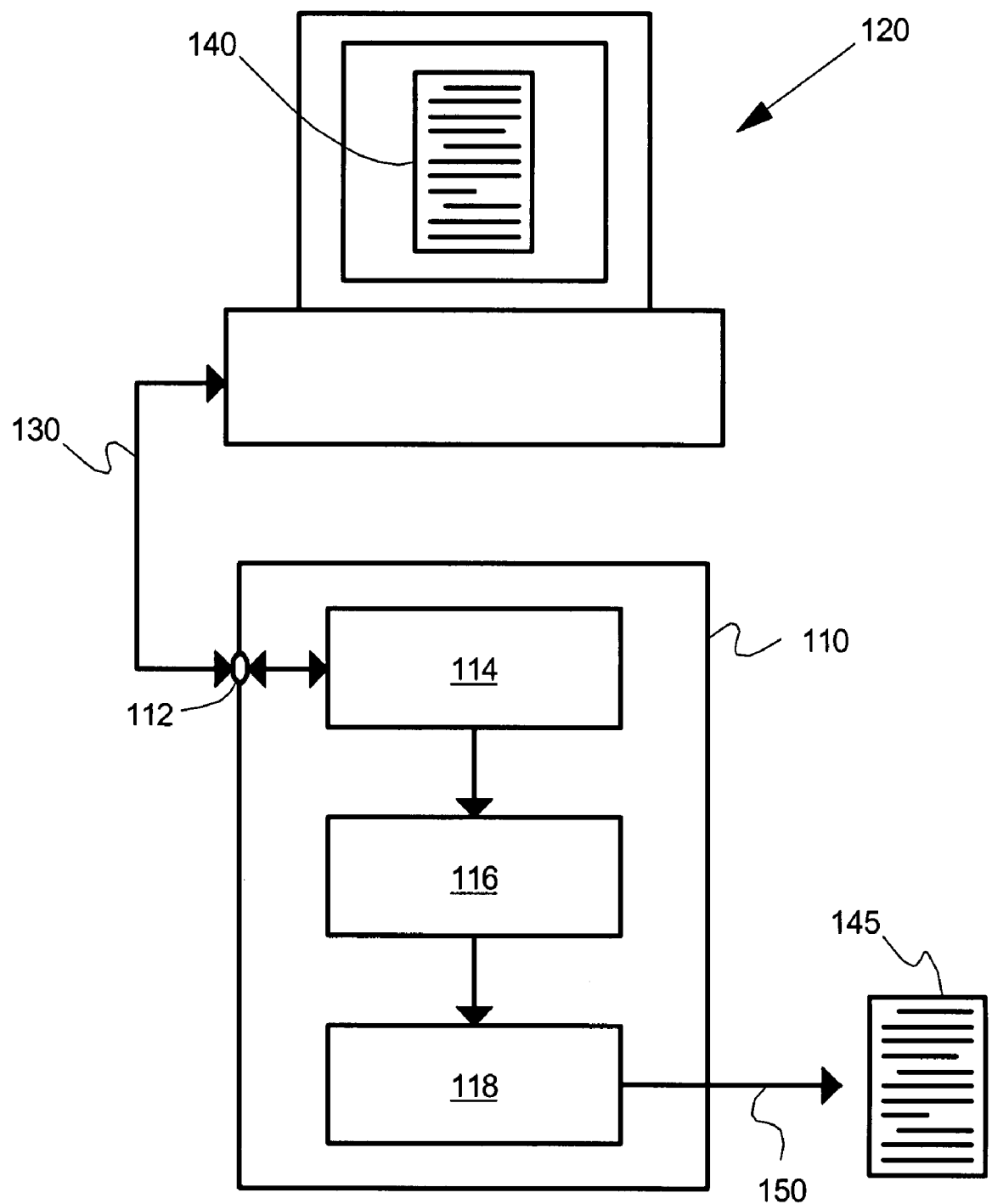
FIG. 1 is a schematic of an imaging device in accordance with an embodiment of the invention.

In the following detailed description of the present embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that process, electrical or mechanical changes may be made without departing from the scope of the present invention. The following detailed description is, therefore, not to be taken in a limiting sense, and the scope of the present invention is defined only by the appended claims and equivalents thereof.

Standard operation of an imaging device is to load its control programs during an initialization of the imaging device, such as during a power-up or re-boot of the device. The control programs contain at least those instructions enabling the imaging device to recognize, interpret and convert image date to a printable image, such as those instructions enabling a processor of the formatter to recognize an incoming data stream of page description language (PDL), and to interpret and convert the PDL to a printable image for input to an engine controlling the mechanical aspects of the device.

Traditionally, these control programs have been stored on the imaging device in a nonvolatile storage media in a compressed form. The most common form of nonvolatile storage media for imaging devices is Flash memory, also referred to as nonvolatile random-access memory (NVRAM). The compressed control programs are then expanded during the initialization and copied or transferred to a volatile storage media such as dynamic random-access memory (DRAM). DRAM is cheaper than NVRAM and DRAM has a higher access rate than NVRAM. However, DRAM requires a periodic refresh, and thus an application of power, to maintain its memory contents. Accordingly, if power is lost to or removed from the imaging device, the control programs residing in DRAM will be lost, but the compressed image of the control programs on the NVRAM will be retained.

While control programs have been stored on nonvolatile storage media, this does not imply that the control programs are necessarily permanent. Although low-end or older imaging devices may utilize a read-only memory (ROM) that is unalterable by the end user, it is more common for the control programs to be stored on a nonvolatile storage media that is alterable by the end user. This ability is useful for upgrading the control programs, e.g., providing different or additional features, or for correcting the control programs, e.g., providing fixes to known errors within the control programs.

As an example, NVRAM can be rewritten or reprogrammed to change its memory contents to represent the upgraded control programs. This is typically accomplished by sending a file to the imaging device having a data structure that is recognized by the imaging device's operating system as containing control programs. This file, or firmware upgrade, is typically identified using header information within the file. When the imaging device identifies an incoming data stream as containing a firmware upgrade, the file is processed to replace the control programs currently residing in the NVRAM.

For the various embodiments, control programs for one or more imaging devices are stored remote from the imaging devices for access during the initialization of the imaging devices. The control programs are communicated to an input of an imaging device during an initialization of the imaging device, permitting bypass, and thus elimination, of nonvolatile storage media devoted to the control programs. The input is preferably an input/output (I/O) port of the imaging device, such as a parallel port, serial port, universal serial bus (USB) port or other such communication port. The I/O port is used by the imaging device for receiving, among other things, image data from a network or local host device.

FIG. 1 is a schematic of an imaging device 110 in accordance with an embodiment of the invention. The imaging device 110 is in communication with a host device 120 through a communication interface 130. The imaging device 110 may be any device for producing a tangible image from image data. Examples include printers, facsimile machines (faxes), plotters and multi-function devices. The host device 120 may be a local host device, such as a personal computer or other workstation, providing direct communication between an end user and the imaging device 110. The host device 120 may further be a networked host device, such as a network server, acting as an intermediary between an end user and the imaging device 110.

The imaging device 110 includes a communication port or I/O port 112. The I/O port 112 serves as a communication input for image data and other data, such as configuration data, commands and firmware upgrades, from the host device 110. The I/O port 112 also serves as a communication output for communicating status information or requests to the host device 120.

Data streams received at the I/O port 112 are interpreted by a formatter 114. If the data streams are recognized as image data, such as data describing an image 140, the image data is converted to a printable image for input to an engine 116. The engine 116 controls operation of a mechanical portion 118 of the imaging device 110 to produce a tangible image 145 on an output 150.

Figure 2:
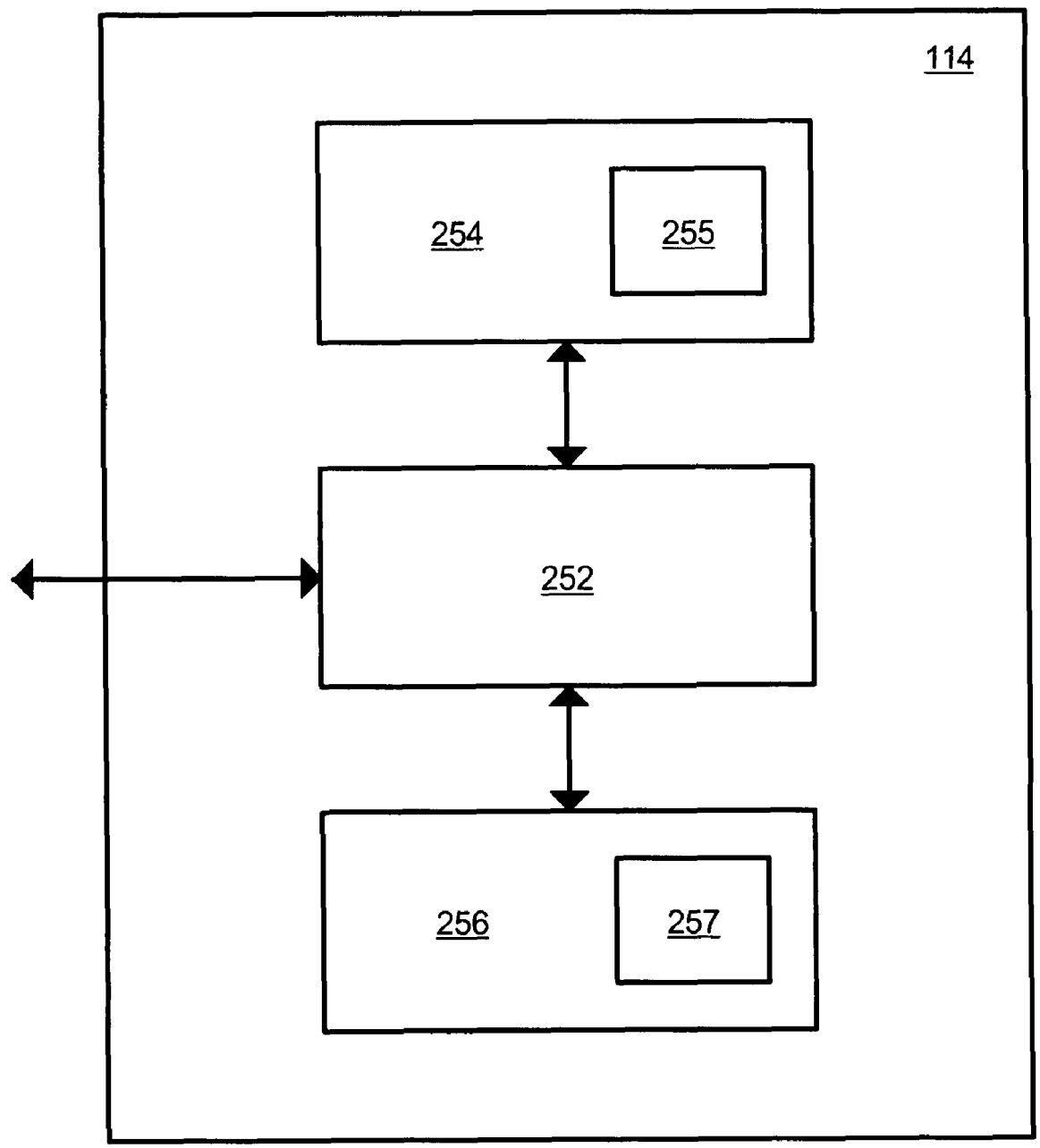
FIG. 2 is a schematic of a formatter in accordance with an embodiment of the invention.

FIG. 2 is a schematic of a formatter 114 in accordance with an embodiment of the invention. The formatter 114 includes a processor 252 for communication with the I/O port 112 and the engine 116 of an imaging device 110. The processor is further in communication with a nonvolatile storage media 254 and a volatile storage media 256. The storage media 254 and 256 are computer-usable media for storing computer-readable instructions for execution by the processor 252.

The nonvolatile storage media includes a portion of code, or a set of computer-readable instructions 255. The set of computer-readable instructions 255 facilitate the operating system of the formatter 114. That is, the set of computer-readable instructions 255 enable the processor 252 to communicate across the I/O port 112 of the imaging device 110 and to communicate with the engine 116. For one embodiment, the set of computer-readable instructions 255 are capable of causing the processor 252 to request and receive a control program from a device external to the imaging device 110, such as a host device 120.

The request is provided on the I/O port 112 of the imaging device 110. The processor 252 then looks for incoming data streams on the I/O port 112. Incoming data streams are analyzed by the processor 252 to determine whether they are indicative of a file containing a valid control program for the imaging device 110, e.g., as indicated in file header information. When an appropriate file is identified, the processor 252 processes the information to store the control program on the volatile storage media 256 as a portion of code, or a set of computer-readable instructions 257.

For one embodiment, the nonvolatile storage media 254 includes no computer-readable instructions capable of causing the processor 252 to convert image data into a printable image for use by the engine 116, i.e., the imaging device 110 contains no nonvolatile image of a formatter control program. For another embodiment, the nonvolatile storage media 254 contains a default version of a control program capable of causing the processor 252 to convert image data into a printable image. Such a default version, however, is preferably unalterable by an end user of the imaging device 110. As an example, the default version of the control program can be stored on a ROM that is programmed as part of a manufacturing process of the imaging device 110. The default version of the control program would be expanded from the nonvolatile storage media 254 and copied to the volatile storage media 256 for use by the processor 252 if no control program is available in response to the request provided at the I/O port 112. For such an embodiment, the imaging device 110 would have a base functionality as provided by the default version of the control program. Additional features or fixes would be available only upon receiving a control program via the I/O port 112 for transfer to the volatile storage media 256.

Figure 3:
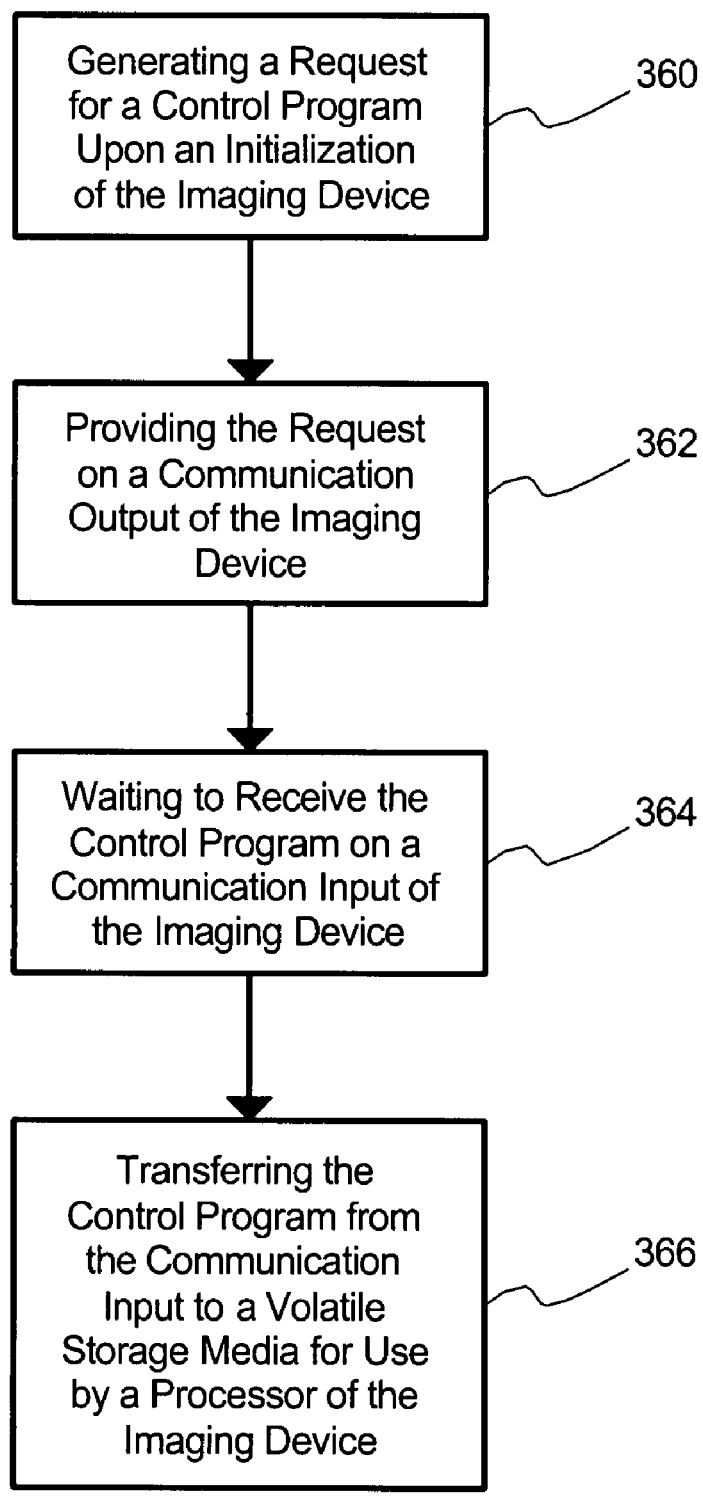
FIG. 3 is a flowchart of a method of operating an imaging device in accordance with an embodiment of the invention.

FIG. 3 is a flowchart of a method of operating an imaging device in accordance with an embodiment of the invention. At action box 360, the imaging device generates a request for a control program upon an initialization of the imaging device. For example, during a boot sequence, a processor generates a signal indicative of a desire to receive a control program from an external device. In more detail, the imaging device may request identification of what host device it is connected to. When a host device acknowledges, the imaging device may ask if the host has a control program for the imaging device. If the host device acknowledges that it has an appropriate image of the control program, the imaging device can then request that it be communicated to the imaging device.

The imaging device provides the request on a communication output of the imaging device, e.g., the I/O port, at action box 362. For one embodiment, the request is provided on the communication output of the imaging device through a communication output of a formatter of the imaging device as provided, e.g., on a communication output of a processor of the formatter. If the imaging device is connected to a local host device, or if a host device acknowledged that a control program was available, the imaging device may direct the request to a specific device. Alternatively, if the imaging device is on a network, and the host device did not acknowledge that a control program was available, the request may be broadcast to other network devices.

After communicating the request, the imaging device waits to receive a control program on a communication input of the imaging device, e.g., the I/O port, at action box 364. Image data may be accepted by the imaging device while it waits for the control program. However, such image data would be stored on some computer-usable media, such as the volatile storage media or even the nonvolatile storage media of the imaging device, until a control program was available to convert the image data to a printable image.

When a control program, i.e., a data stream having data representative of an image of the control program, arrives at the communication input of the imaging device at action box 366, the control program is transferred to the volatile storage media for use by the processor to convert any image data into a printable image. Recognizing a data stream as having data representative of a control program need not be different from existing recognition of a firmware upgrade file. However, instead of programming a nonvolatile storage media to contain the compressed image of the control program, a decompressed image is transferred directly to the volatile storage media.

Figure 4:
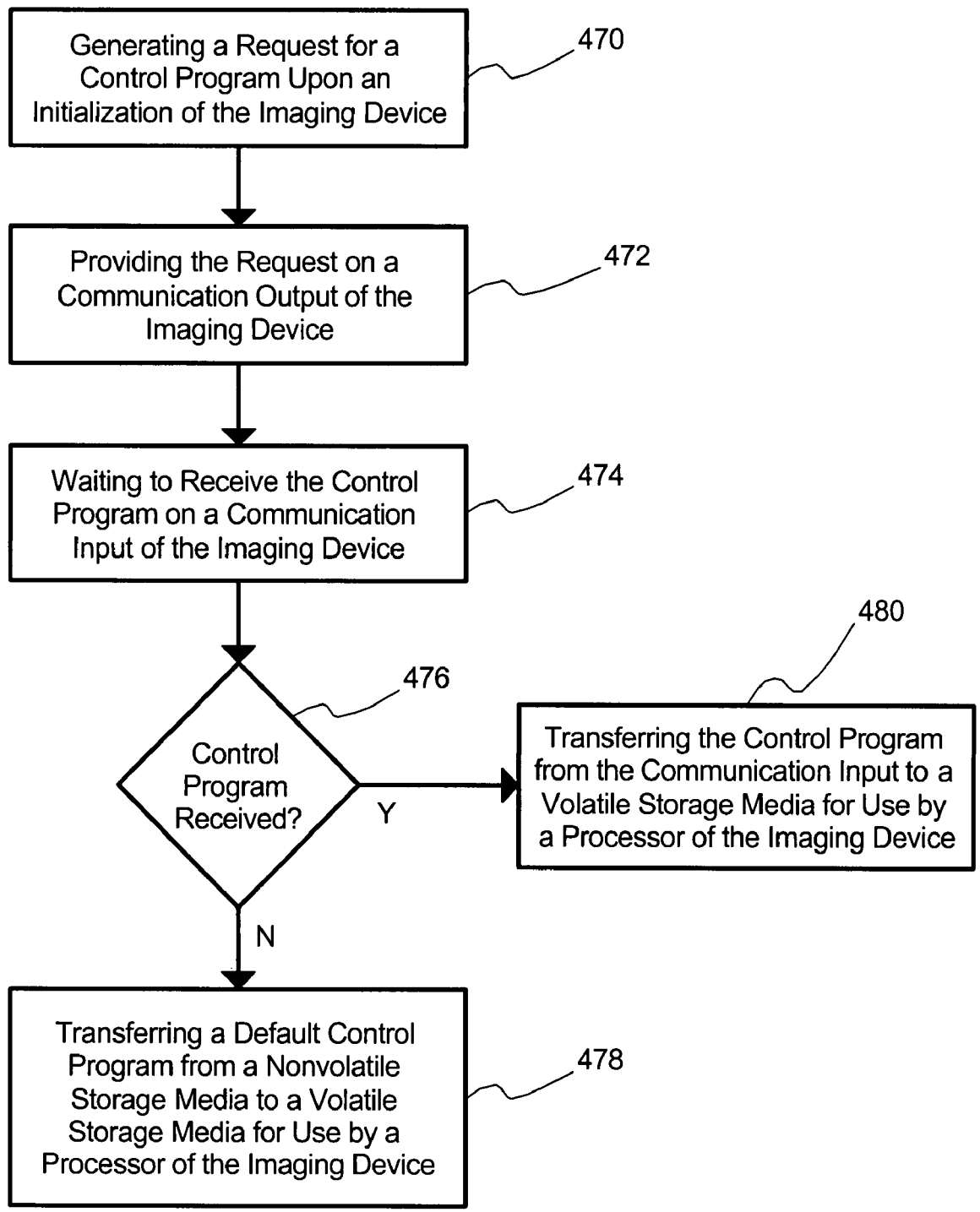
FIG. 4 is a flowchart of a method of operating an imaging device in accordance with another embodiment of the invention.

FIG. 4 is a flowchart of a method of operating an imaging device in accordance with another embodiment of the invention. For the embodiment of FIG. 4, the imaging device has an available image of a default control program.

At action box 470, the imaging device generates a request for a control program upon an initialization of the imaging device. For example, during a boot sequence, a processor generates a signal indicative of a desire to receive a control program from an external device. The imaging device provides the request on a communication output of the imaging device, e.g., the I/O port, at action box 472. After communicating the request, the imaging device waits to receive a control program on a communication input of the imaging device, e.g., the I/O port, at action box 474. Image data may be accepted by the imaging device while it waits for the control program.

If no control program is received within a predetermined timeout period at decision box 476, a default control program is transferred to the volatile storage media at action box 478 for use by the processor to convert any image data into a printable image. The imaging device may provide some indication to a user of the imaging device that a control program could not be found external to the imaging device. For example, the imaging device may provide a message for display to a user of the host device and/or the imaging device may provide a message on a display of the imaging device itself. If a control program arrives at the communication input of the imaging device at decision box 476 prior to an expiration of the timeout period, the control program received at the communication input is transferred to the volatile storage media at action box 480 for use by the processor to convert any image data into a printable image.

The methods of the various embodiments are suited to be performed by computer processors in response to instructions in either software, firmware or hardware. These computer-readable instructions are stored on a computer-usable medium and are adapted to cause the processor to perform the methods. In a hardware solution, the instructions are hard coded as part of a processor, e.g., an application-specific integrated circuit (ASIC) device, to perform the methods of one or more of the embodiments. In a software or firmware solution, the instructions are stored for retrieval by the processor. Some additional examples of computer-usable media include static or dynamic random access memory (SRAM or DRAM), read-only memory (ROM), electrically-erasable programmable ROM (EEPROM), magnetic media and optical media, whether permanent or removable.

The various embodiments are particularly beneficial in networked environments having multiple imaging devices using the same control program. In this scenario, upgrading these multiple devices may be accomplished simply by providing the updated control program images to a network server acting as a host device for each of the imaging devices. As each imaging device is initialized, it will look to the host for its control program and automatically receive the updated version without individually updating each imaging device.

Although the various embodiments reduce the need for nonvolatile storage media, in that the control programs need not reside on a nonvolatile storage media within the imaging device, the imaging devices may still contain some base level of nonvolatile storage media. For example, it may be desirable to maintain a nonvolatile image of code for use in troubleshooting or for providing other user help information.

CONCLUSION

Imaging devices and methods of operating imaging devices have been described that facilitate reducing nonvolatile storage needs of the imaging devices. The imaging devices are adapted to request control programs from external devices. Control programs are received on a communication input of the imaging device and stored on a volatile storage media for use by a processor of the imaging device. A default control program is used if no control program is received via the communication input within a predetermined timeout period. The embodiments can also facilitate more reliable updating within a networked system in that updating an image of a control program on one network device can automatically lead to updating of multiple imaging devices, thus eliminating a need to individually update each imaging device.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any such adaptations or variations of the invention. It is manifestly intended that this invention be limited only by the following claims and equivalents thereof.

What is claimed is:

1. An imaging device, comprising:
   a communication input for receiving image data and other signals from an external device;
   a communication output;
   a formatter for converting image data into a printable image as directed by a control program;
   a first computer-usable media for storing the control program;
   a second computer-usable media having computer-readable instructions stored thereon capable of causing a processor to perform a method, the method comprising:
   providing a signal on the communication output of the imaging device indicative of a desire to transfer a control program from an external device to the communication input of the imaging device;
   waiting for a control program to be received on the communication input of the imaging device in response to the signal;
   delaying conversion of any image data for a predetermined timeout period while waiting for a control program to be received on the communication input of the imaging device; and
   transferring a default control program from the second computer-usable media to the first computer-usable media if no control program is received on the communication input prior to expiration of the timeout period.

2. The imaging device of claim 1, wherein the communication input and the communication output are a single communication port.

3. A method of operating an imaging device, comprising:
   generating a request for a control program upon an initialization of the imaging device, wherein the control program is adapted to convert image data received by the imaging device into a printable image;
   providing the request on a communication output of the imaging device for receipt by an external device;
   waiting to receive the control program via a communication input of the imaging device;
   delaying conversion of any image data received by the imaging device while waiting to receive the control program via the communication input; and
   using a default control program if no control program is received via the communication input within a predetermined timeout period.

4. The method of claim 3, further comprising:
   transferring the control program from the communication input to a volatile storage media of the imaging device.

5. The method of claim 3, wherein generating a request for a control program further comprises generating a signal indicative of a desire to receive a control program from an external device.

6. The method of claim 5, wherein the signal is directed to a single external device.

7. The method of claim 3, further comprising:
   requesting identification of a host device connected to the imaging device prior to generating the request for a control program.

8. The method of claim 7, further comprising:
   waiting for an acknowledgement by the host device after requesting identification; and
   asking the host device if it has an available control program.

9. The method of claim 8, further comprising:
   broadcasting the request for a control program to multiple external devices if the host device does not have an available control program.

10. The method of claim 3, further comprising:
    if received prior to the predetermined timeout period, transferring the control program received via the communication input to a volatile storage media of the imaging device for use in converting any image data received by the imaging device.

11. A computer-usable medium having computer-readable instructions stored thereon capable of causing a processor to perform a method, the method comprising:
    in response to an initialization process, generating a request for a control program from an external device for converting image data into a printable image;
    providing the request on a communication output of the processor;
    waiting to receive the control program via a communication input of the processor;
    delaying conversion of any image data received by the processor while waiting to receive the control program via the communication input; and
    using a default control program if no control program is received via the communication input within a predetermined timeout period.

12. The computer-usable medium of claim 11, wherein the computer-usable medium and the processor are both part of an application-specific integrated circuit device.

13. The computer-usable medium of claim 11, wherein the computer-usable medium and the processor are separate parts of a formatter for an imaging device.

14. The computer-usable medium of claim 11, wherein generating a request for a control program from an external device further comprises generating a signal on the communication output of the processor indicative of a desire to receive a control program from an external device.

15. The computer-usable medium of claim 14, wherein the signal is adapted to be directed to a single external device.

16. The computer-usable medium of claim 11, wherein the method further comprises:
   requesting identification of any host device connected to the processor prior to generating the request for a control program.

17. The computer-usable medium of claim 16, wherein the method further comprises:
   waiting for an acknowledgement by a host device after requesting identification; and
   asking the acknowledging host device if it has an available control program.

18. The computer-usable medium of claim 17, wherein the method further comprises:
   broadcasting the request for a control program to multiple external devices if the acknowledging host device does not have an available control program.

19. The computer-usable medium of claim 11, wherein the method further comprises:
   if received prior to the predetermined timeout period, transferring the control program received via the communication input to a storage media for use in converting any image data received by the processor.

* * * * *